United States Patent [19]

Tsunekawa et al.

[11] 4,034,384
[45] July 5, 1977

[54] EXPOSURE METER CIRCUIT OF CAMERA WITH MATCHING NETWORK FOR FLASH DEVICE

[75] Inventors: Tokuichi Tsunekawa, Yokohama; Soichi Nakamoto, Machida; Tetsuya Taguchi, Kawasaki, all of Japan

[73] Assignee: Canon Kabushiki Kaisha, Tokyo, Japan

[22] Filed: June 9, 1975

[21] Appl. No.: 584,831

Related U.S. Application Data

[62] Division of Ser. No. 434,448, Jan. 18, 1974, abandoned.

[30] Foreign Application Priority Data

Jan. 24, 1973 Japan .............................. 48-10014
Feb. 28, 1973 Japan .............................. 48-23938

[52] U.S. Cl. ................................. 354/33; 354/145
[51] Int. Cl.$^2$ .......................................... G03B 7/16
[58] Field of Search .............. 354/27, 32, 33, 34, 354/139, 145, 149; 315/241 P

[56] References Cited

UNITED STATES PATENTS

| | | | |
|---|---|---|---|
| 3,703,130 | 11/1972 | Watanabe | 354/50 |
| 3,723,810 | 3/1973 | Mashimo | 354/145 |
| 3,873,827 | 3/1975 | Krause | 354/60 E |

Primary Examiner—L. T. Hix
Assistant Examiner—J. A. LaBarre
Attorney, Agent, or Firm—Toren, McGeady and Stanger

[57] ABSTRACT

The present invention relates to an exposure meter circuit of a camera with a matching network for a flash device with which camera auxiliary light photography can be carried out the flash device presents a detecting output terminal of a detecting network for detecting the level of the stored energy of an energy storing means provided in the flash circuit of the flash device, a voltage supply terminal for supplying the operation voltage to the detecting network and a synchronizing terminal for triggering the flash device. With this camera, daylight photographing can also be carried out without a flash device. The exposure meter circuit is characterized in that in the exposure meter circuit a current source is included for the exposure meter. A first switching means is connected with one electrode of the current source. Grounding of the current source occurs in functional connection with the switching of the flashlight photographing over to the daylight photographing. A second switching means is connected in the exposure meter circuit and switches off the light receiving means, where in the case of the flash photographing, the voltage is given to the supply terminal from the current source for the exposure meter by means of said first switching means so as to operate the detecting network. In the case of the daylight photographing, the light receiving means is connected in the exposure meter circuit by means of the first and the second switching means so as to bring the detecting network out of operation by grounding the current source.

4 Claims, 11 Drawing Figures

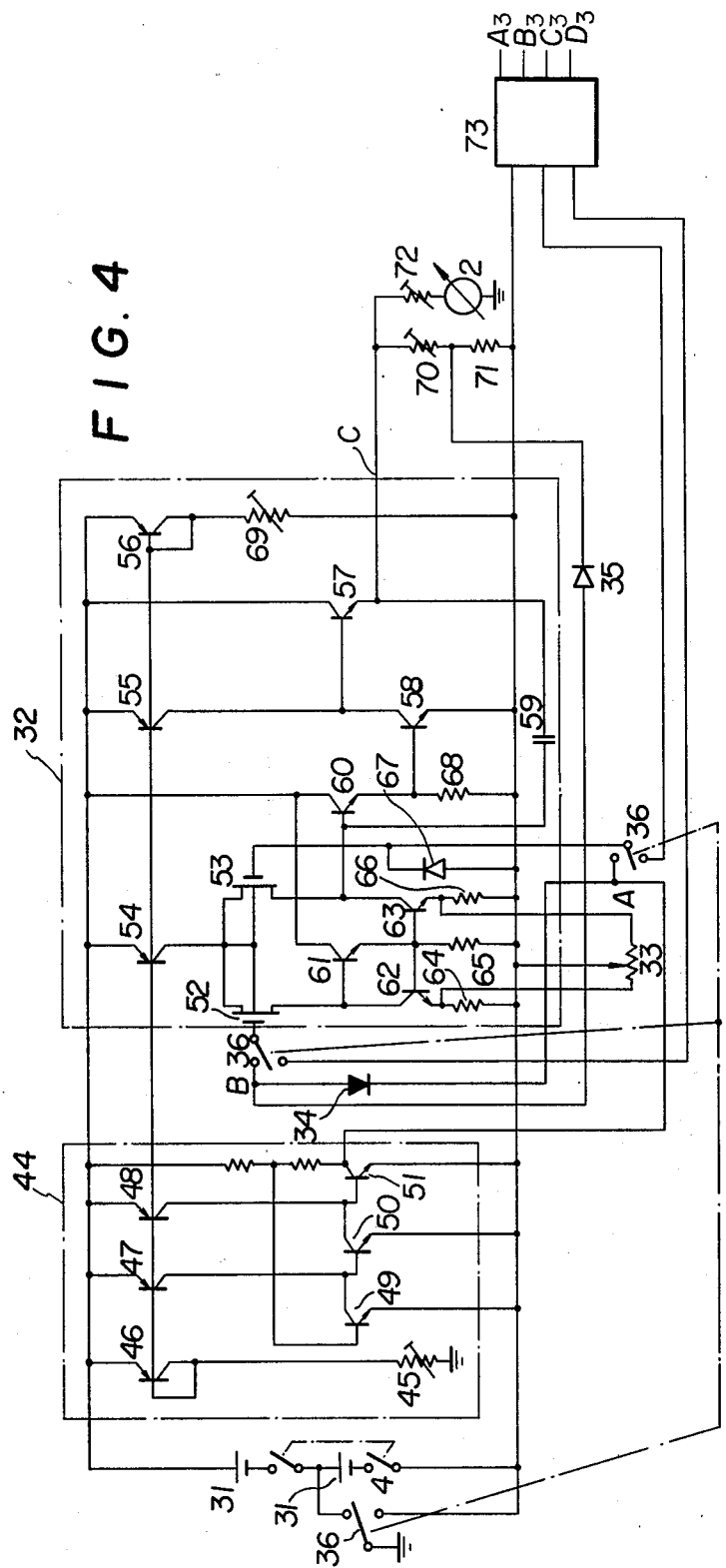

EXPOSURE METER CIRCUIT OF CAMERA WITH MATCHING NETWORK FOR FLASH DEVICE

This is a division of application Ser. No. 434,448 filed Jan. 18, 1974, now abandoned.

BACKGROUND OF THE INVENTION

1. Field of the Invention

The present invention relates to an exposure meter circuit of the camera with a matching network for flash device and particularly to an exposure meter circuit of the camera with matchability with the detecting network for detecting the quantity of flashlight automatically.

2. Description of the Prior Art

When the so called speed light device is used as a flash device, conventionally the electrical energy flash is stored in the condensor in advance and by means of the synchronizing flash signal from the camera side, the stored energy is converted into the energy of light (for example, in a Xenon tube) so as to obtain an auxiliary illumination.

In case of such speed light device, the quantity of flashlight is set according to the energy charged in the condensor so that it is essential to charge the condensor always up to a certain determined level in order to obtain a certain determined quantity of light. Therefore the determined light quantity cannot be obtained when the speed light device operates while the level of the stored energy is lowered due to the consumption of the current source or before the condensor has been fully charged, which is disadvantageous because proper auxiliary light photography cannot be carried out.

In order to eliminate the above mentioned disadvantage, a method has been proposed according to which the level of the stored energy in the flashlight device is always detected by means of a detecting network so as to control the exposure element such as a diaphragm device on the camera side in such a manner that a proper correction corresponding to the stored energy is always carried out on the exposure elements.

FIG. 1 and FIG. 2 respectively show a circuit of a flashlight device and a circuit of an exposure meter at the camera side, to be connected with the above mentioned circuit. In FIG. 1, 1 is a photoconductive element, 2 an ampere meter, 3 a cell, 4 the main switch, 5 the trigger contact for the flashlight device. In FIG. 2, 6 is the cell, 7 to 11 compose an oscillation network for charging, in which 7 is a transistor, 8 and 9 condensors, 10 a coil and 11 a resistance for starting the oscillation. 12 are diodes, 13 the main condensor and 14 to 16 a trigger network, whereby 14 is a resistance, 15 a trigger condensor, 16 a trigger coil and 17 a discharge tube. 18 is a triple main switch for flash device. 19 to 30 compose a network automatic flashlight, whereby 19 is the resistance for transmitting the information of the distance of the object, 20 and 21 are the resistances for controlling the potential of the base of the transistor 28 so as to set the level of the output. 22 and 23 are the resistance for determining the light producing voltage of the neon tube 24. 25 is the resistance for determining the potential of the collector of the switching transistor, while 26 is the resistance for determining the characteristics between the distance of the object and the deflection angle of the ampere meter in the camera.

The transistors 27 and 28 and the resistance 29 and 30 indicate the elements for forming a detection circuit to detect the voltage which charges the main condenser 13. In order to connect the flashlight device (FIG. 2) with the camera (FIG. 1) $A_1$ is connected with $A_2$, $B_1$ with $B_2$, $C_1$ with $C_2$ and $D_1$ with $D_2$. In order to bring the automatic flashlight mechanism which uses the ampere meter in the camera into operation it is necessary to supply a voltage of + 1.3V to the terminal $B_2$ from the terminal $D_2$. Further in order to connect the electrical network at the camera side with that of the flashlight device it is most rational to carry out the electrical connection by making the standard potential at the camera side match with that of the body of the flashlight device, because in this way the number of the electrical contacts between the camera and the flashlight device becomes minimum.

When however other exposure meter circuit than is shown in FIG. 1 is connected to the flashlight circuits shown in FIG. 2, the foregoing voltage of + 1.3 V from the terminal $D_2$ is not applied to terminal $B_2$, thus the detecting network consisting of 27 to 30 of the flashlight device does not operate effectively. Further the exposure meter circuit itself does not have the automatic flashlight function and in taking the energy storage quantity of the flashlight no effective function can be expected of the flashlight circuit, which is disadvantageous.

SUMMARY OF THE PRESENT INVENTION

The purpose of the present invention is to offer an exposure meter circuit with which the auxiliary light photographing can always be carried out with the function of the automatic flash when it is used with a flashlight device with a detecting network of flashlight quantity and with which the daylight photographing can also be carried out whereby the exposure value is automatically set.

Another purpose of the present invention is to offer an exposure meter circuit capable of measuuring the light over a wide range, presenting optimum output characteristics from the lower range of the brightness of the object up to the higher range at the daylight photographing by adopting a photoelectromotive cell as a light measuring means, combining said light measuring means with a computing amplifier and setting the off-set voltage of said amplifier.

A further purpose of the present invention is to offer an exposure meter circuit which is so constructed as to correspond with the characteristics of a measuring instrument being connected with the output of the network for the indication of the exposure value, by connecting an element presenting logarithmically transducing characteristics such as a logarithmical diode between the input and the output of the computing amplifier network and by forming a feed back channel by means of a voltage dividing load resistance connected with the output of the amplifier in such a manner that the voltage dividing ratio is variable.

Further another purpose of the present invention is to offer an electronic exposure meter circuit presenting an output which compensates the characteristics of reciprocity law failure of the applied photosensitive material, by setting the resistance for setting the off-set voltage of the above mentioned computing amplifier network so as to produce non-linear output characteristics in the lower range of the brightnes of the object.

In this way, the resistance for setting the off-set voltage means the resistance for varying the bias voltage for varying the threshold voltage value of the active element pair composing the differential amplifier network when a differential amplifier network is used as computing amplifier network.

Below the present invention will be explained in detail together with further other purposes according to the attached drawings of embodiments of the present invention.

BRIEF DESCRIPTION OF THE DRAWINGS

FIG. 4. shows another embodiment of the exposure meter circuit shown in FIG. 3.

DESCRIPTION OF THE PREFERRED EMBODIMENTS

Figure 1:
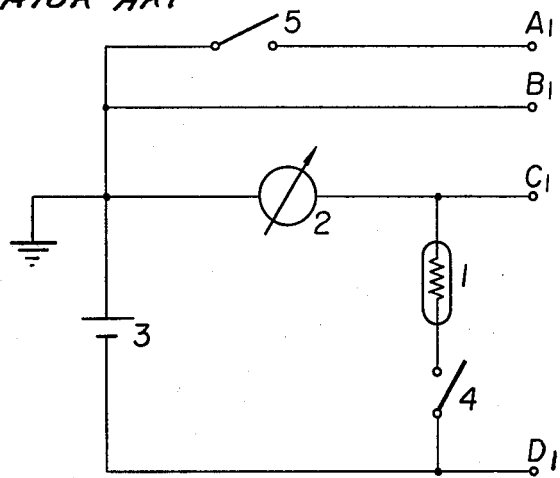
FIG. 1 shows a conventional exposure meter circuit in which a photoconductive element is used as light receiving element.

Below the concrete embodiments will be explained in detail.

In FIG. 3, 31 to 36 compose a light measuring network for the daylight photographing, whereby 31 is cells, 32 an amplifier, 33 the resistance for adjusting off-set voltage of the amplifier 32, 34 a photoelectromotive element, 35 a logarithmically transducing element for logarithmically transducing the output of the photoelectromotive element 34 so as to make the deflection angle of the ampere meter 2 equidistant, 36 a triple switch for switching the daylight photographing over to the flashlight photographing. 37 to 43 compose an electrical network for matching the flashlight device presenting an automatic flash mechanism with the network at the camera side in view of the characteristics, whereby 37 and 38 are the resistances for transduucing the inclination of the output voltage to be fed into the ampere meter while 39 and 40 are the resistances for transducing the level of the input voltage to be fed into the ampere meter. 41, 42 and 43 are the resistances for setting the input level of the amplifier 32.

Figure 2:
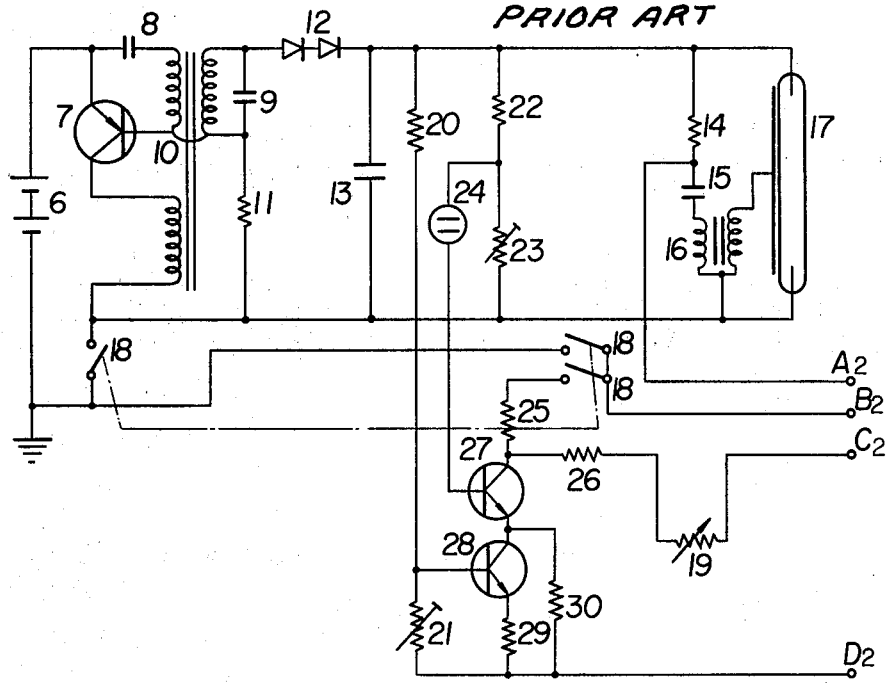
FIG. 2 shows an electric network of the flashlight presenting an automatic flash mechanism which makes use of the ampere meter in the camera.
Figure 3:
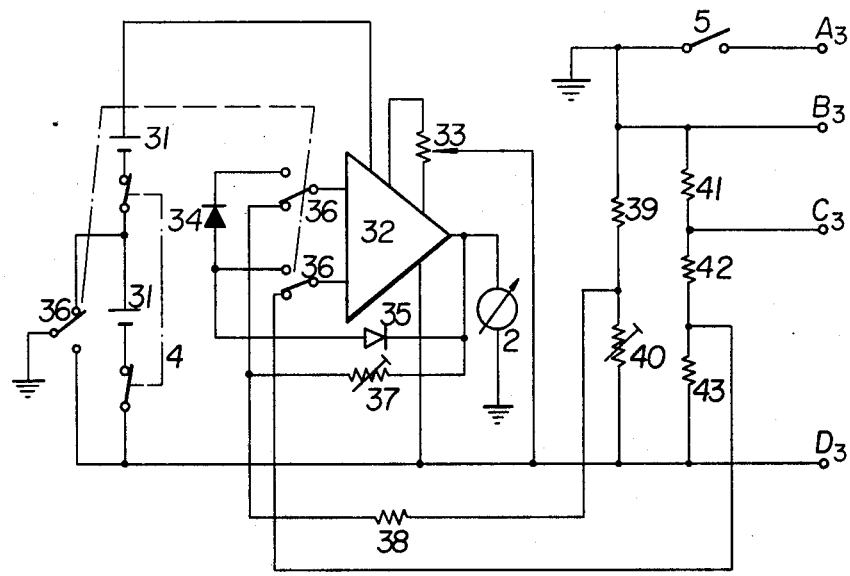
FIG. 3 shows an exposure meter circuit of the camera presenting a means for electrically matching with the flashlight device shown in FIG. 2.

The triple switch 36 shown in FIG. 3 is at the position for the flashlight photographing, while in case of the daylight photographing the triple switch 36 is connected along the reversed direction. In case of the daylight photographing, the standard potential $B_3$ at the camera side is same as $D_3$, while in case of the flashlight photographing the standard potential $B_3$ at the camera side is by the middle potential of the cell 31 for example + 1.3V higher than $D_3$. Being connected with the flashlight device (FIG. 2) in this state, namely if $A_3$ is connected with $A_2$, $B_3$ with $B_2$, $C_3$ with $C_2$ and $D_3$ with $D_2$, the automatic flash mechanism of the flashlight device operates normally, whereby a proper indication is made in the ampere meter by means of the characteristic transducing network in the camera for the flashlight photographing.

When according to the present invention the standard potential is matched with that of the flashlight device as mentioned above, the heretofore difficult electrical matching between the camera and the flashlight device can be successfully carried out, so that the automatic flash photographing becomes possible without lowering the efficiency of the network at the flashlight device side while at the same time the exposure setting for the daylight photographing is also possible.

When a network as shown in FIG. 3 is provided on a printed board, the output current of the photoelectromotive element 34 as well as of the amplifier 32 will leak through the printed board. As the result during daylight photographing especially in the range of lower brightness, the linear characteristics of the output current cannot be obtained, whereby error takes place in the light measurement.

Figure 5:
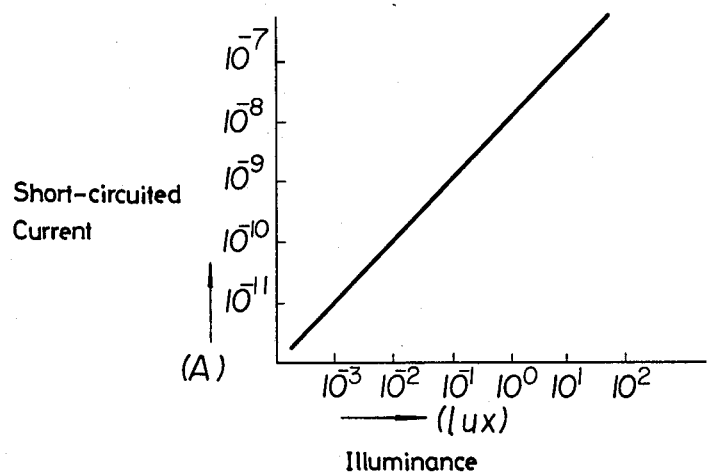
FIG. 5 and FIG. 6 respectively show a characteristics diagram of the photoelectromotive cell to be applied for the circuit shown in FIG. 4.

FIG. 4 shows a network arrangement capable of compensating the error in light measurement due to the leakage current. Below, the network shown in FIG. 4 will be explained in detail. In the drawing, 44 is the voltage stabilizing network comprising elements 45 to 51, whereby 45 is the variable resistance for adjusting the output voltage, 46 to 48 transistors presenting the diode characteristics with base and collector short-circuited, 49 to 51 transistors, whereby the output voltage of the above mentioned network can be taken out from the collector terminal of the transistor 51. 32 is the computing amplifier network comprising transistors 54 to 56 presenting the diode characteristics, whereby the base and the collector of each transistor are short-circuited. 52 and 53 are MOS type FET composing a differential amplifer, whereby the terminals of a photoelectromotive element such as a blue cell are connected between two input terminals of the differential amplifier by means of a triple switch. Further, 60 and 61 are the transistors connected with the output terminals of the above mentioned differential amplifier 52, 53, whereby the output of the above mentioned differential amplifier is amplified by means of the transistor 58 and supplied to the ampere meter by means of the transistor 57 connected with the emitter follower. 59 is the condensor for preventing oscillation, 62 and 63 the transistors, 64 to 66 the resistances, 67 the diode, 68 the resistance connected with the base of the amplifier transistor 58, 59 the variable resistance for limiting the current running through the transistor 56, 70 and 71 the bleeder resistances to be connected with the output terminal of the amplifier 32 and 72 the variable resistance for limiting the current flowing through the ampere meter 2 and serving to carry out the compensation in such a manner that the output voltage of the computing amplifier 32 matches with the response characteristics of the ampere meter 2. In this figure, the same elements as those in FIG. 3 have the same reference number. Further 73 shows a network shown by 37 to 43 in FIG. 3 for making the flashlight device presenting an automatic flash mechanism match with the characteristics of the network at the camera side. Further, as mentioned above in the above mentioned voltage stabilizer circuit 44, diode 46 – 48 are provided in such a manner that the voltage stabilizer circuit 44 presents such a diode characteristics of the temperature variation as to compensate the synthetic characteristics variation of the temperature of the cell 34, the logarithmic diode 35 and the ampere meter 2. The cell 34 receiving a light from the object presents a linear output short circuit current characteristics over the wide range as shown in FIG. 5 in case the cell 34 is not given a bias voltage. Therefore it is expected that the characteristics of the output amplified by the amplifier network 32, of the cell 34 receiving a light from the object be linear from the lower range of the brightness up to the higher range.

Figure 6:
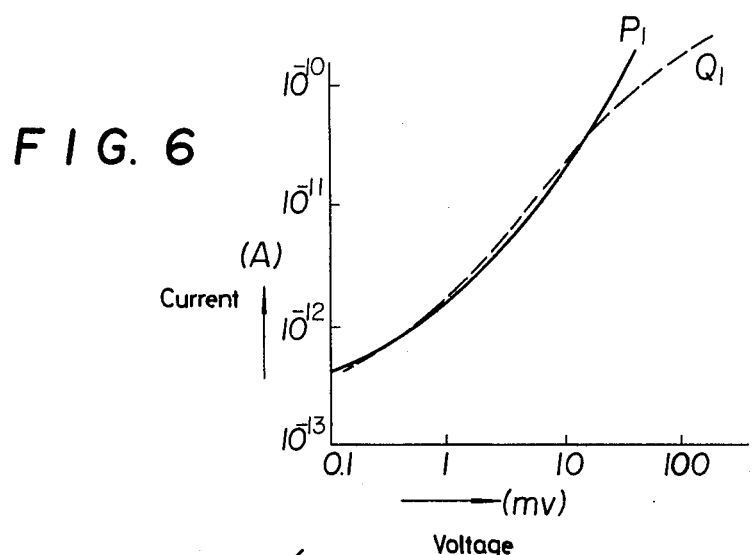
Figure 7:
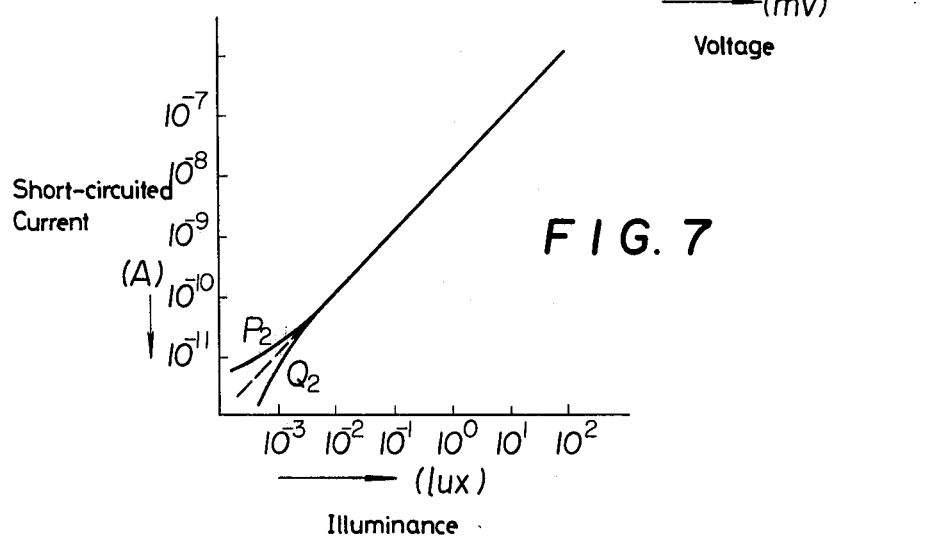
FIG. 7 shows a characteristics diagram of the short-circuited current when the cell to be applied for the circuit shown in FIG. 4 is given a voltage along the forward direction and the reverse direction.
Figure 8:
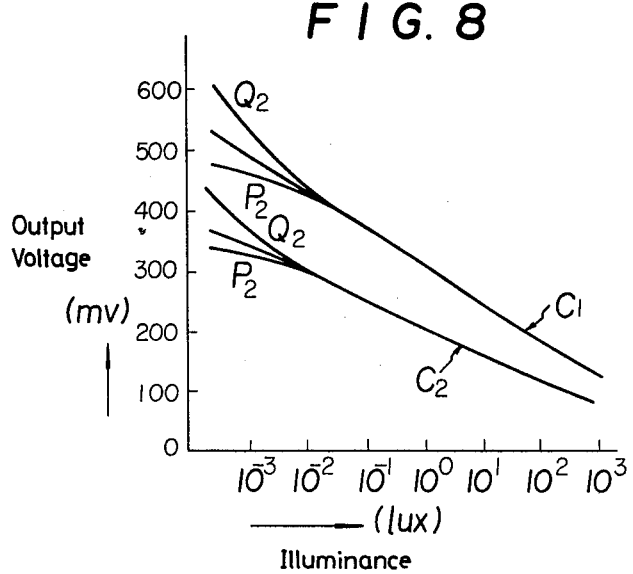
FIG. 8 shows a diagram of the output characteristics of the amplifier network to be applied in the circuit shown in FIG. 1.
Figure 9:
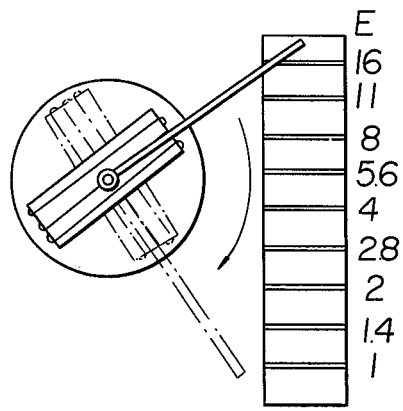
FIG. 9 shows a disposition of the ampere meter to be applied in the circuit shown in FIG. 4.
Figure 10:
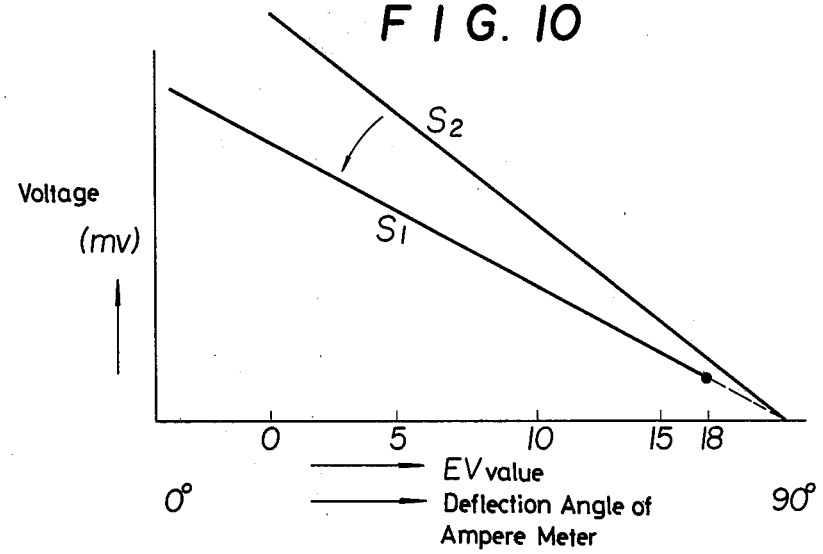
FIG. 10 shows a characteristics diagram of the deflection angle of the ampere meter shown in FIG. 6.

However, due to the current leakage it would be impossible to obtain a linear output characteristics over the wide range unless a voltage which compensates the current leakage is applied to the photoelectromotive cell 34. FIG. 6 shows the characteristics of the current flowing through the cell 34 along the forward direction and along the reverse direction, namely the diode characteristics of the cell 34, whereby the curve $P_1$ shows the characteristics of the current flowing through the cell 34 along the forward direction while $Q_1$ shows the characteristics of the current running through the cell 34 along the reverse direction. As can be understood for the FIG. 6, it is possible to shift the value of the output current of the cell by applying a voltage to the cell along the predetermined direction, so that the current leakage can be eliminated by making the value of the voltage to be applied to the cell variable. For this purpose, the voltage stabilizer network 44 presents the resistance 45 for varying the value of the voltage so as to apply a constant voltage to the point A of the cell 34. When several mV of voltage is applied to the point B of the cell 34 along the forward (or reverse) direction by applying a constant voltage to the cell 34 from the voltage stabilizer network 44 and making the resistance 33 for setting the off-set voltage variable, the short-circuit current characteristics of the cell 34 becomes non linear in the lower range of brightness as shown by the curve $Q_2$ of FIG. 7. Similarly when several mV of voltage is given to the point B of the cell 34 along the reverse direction, the characteristics becomes as shown by the curve $P_2$ of FIG. 7. Further it is possible that characteristics of the output amplified by the amplifier 32, of the cell 34 being applied with a voltage along the forward direction or along the reverse direction becomes linear because the current leakage of the cell 34 decreases due to the applied voltage, whereby by adjusting the variable resistance 33 for setting the off-set voltage the output voltage of the amplifier network presents a characteristics as shown in FIG. 8. Namely the non-linearity in the lower range of the brightness is enlarged while the output level is gradually and totally shifted as shown by the curves $C_1$ and $C_2$. When further the amplification factor of the amplifier 32 is sufficiently large, the potential difference between the terminals of the cell 34 can be neglected and the output voltage $e_o$ of the output terminal C of the amplifier network 3 is given by the equation $$e_o = \left(1 + \frac{R_1}{R_2}\right)\left(e_s - \frac{kT}{q}\log_e\left(\frac{i}{i_o} + 1\right)\right) - R_1 i$$

whereby $e_s$ is the potential at the point A, $i$ the photoelectric current due to the cell 34, $R_1$ and $R_2$ respectively the values of the resistances 70 and 71. Hereby $i_o$ is the saturated current of the logarithmic diode 35 along the reverse direction, while $kT/q$ is usually a voltage near 25 mV at the ordinary temperature. $R_1 i$ in the above equation represents a term for the error arising from the increase of the inclination of the output voltage at the output terminal and can be neglected by making $R_1$ small. As is clear from the above equation the output voltage $e_o$ is, by the ratio of the resistance 70 to that 71 namely $R_1/R_2$ by means for the feed back network of the diode 35. Because the network shown in FIG. 4 presents the above mentioned characteristics it is possible to make the characteristics correspond to a desired current characteristics either by adjusting the value of the resistance 70 and 71 so as to match with the desired characteristics of the deflection angle of the ampere meter or by making the slope of the output voltage characteristics of the amplifier network larger than that of the desired characteristics of the deflection angle of the ampere meter as shown in FIG. 10, by adjusting the resistance 72. Because in this case however the output voltage of the amplifier network decreases according to the increase of the brightness of the object, it is to be noted that the scale is inverse to the ordinary one when the value of diaphragm is indicated with the deflection angle of the ampere meter.

Figure 11:
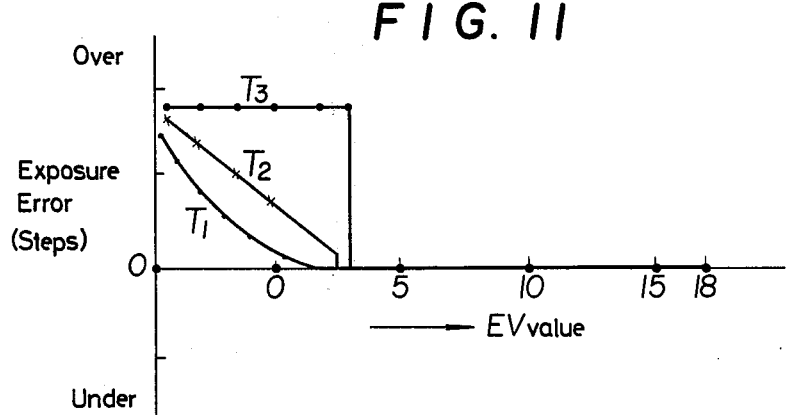
FIG. 11 shows an explanation diagram for the exposure accuracy according to the circuit shown in FIG. 4.

When the resistance 33 for setting the off-set-voltage is varied after the resistances 70 and 71 or the resistance 72 is adjusted in such a manner that the desired characteristics of the deflection angle of the ampere meter 2 matches with the output voltage characteristics of the amplifier network in the above mentioned network, the characteristics of the output voltage of the amplifier 32 becomes non linear in the lower range of the brightness of the object as is shown in FIG. 8, so that an output voltage causing over-exposure is supplied to the ampere meter as is shown by the curve $T_1$ in FIG. 11. Because however the photosensitive material such as photographic film generally presents a characteristics of reciprocity law failure, it is possible to compensate the characteristics of reciprocity law failure that the product of the exposure time with the light quantity (function of diaphragm value) does not give an exposure to the photosensitive material with a certain determined density, by the use of the above mentioned output voltage causing an over-exposure to the ampere meter, therefore, it is possible to obtain a proper exposure over the wide range from the lower range up to the higher one.

Further it is also possible to compensate the characteristics of reciprocity law failure in the lower range by bringing for example the resistance 72 in functional engagement with the shutter speed setting dial only for the range of long exposure time setting in such a manner that the resistance 72 decreases in value, instead of adjusting the resistances 70 and 71. (See the characteristics curves $T_2$, $T_3$ in FIG. 11). In this way, the curve $T_3$ in FIG. 11 is the characteristics curve in case the resistance 72 is continuously varied in functional engagement with the speed to be set at the ling time side of the shutter speed, while $T_2$ is the characteristics curve when the resistance 72 is reduced to a certain determined value at the long time side.

As mentioned above, according to the network it is possible to indicate the exposure value with high accuracy for the light measurement range from the lower range up to the higher one in such a manner that the characteristics of reciprocity law failure in the lower range is compensated and further it is possible to obtain an output characteristics which matches with that of the ampere meter. This is quite effective for the exposure meter circuit.

What is claimed:
1. A camera system comprising:
   a. a storage capacitor;
   b. a flash tube coupled to said storage capacitor for illuminating an object with a light energy corresponding to electric energy stored in the storage capacitor;
   c. a transistorized detecting circuit coupled to the storage capacitor for producing a control signal corresponding to the level of stored electric energy, said transistorized detecting circuit having a control signal terminal for transferring the control signal and a pair of driving voltage receiving terminals, a driving voltage receiving positive terminal of the transistorized detecting circuit being grounded through a switching means;
   d. light sensitive means for producing a first electrical signal corresponding to the amount of light incident from the object to be photographed;
   e. series-connected batteries, each having positive and negative electrodes, said connection of batteries having a connection point and outer negative and positive terminals;
   f. amplifier means having power source terminals connected to the outer terminals of said series-connected batteries and also having input and output terminals;
   g. an exposure meter coupled to the output terminal of said amplifier means for indicating an exposure value corresponding to the first electrical signal;
   h. first change-over means connected with an input terminal of said amplifier means for coupling the light sensitive means with the input terminal of said amplifier means upon the selection of the daylight photography mode and for coupling the control signal terminal of said detecting circuit with the input terminal of said amplifier means upon the selection of the flash photography mode;
   i. a second change-over means connected to ground, the second change-over means being connected to said connection point of the series-connected batteries when the flash photography is selected and being connected to the outer negative terminal of the series-connected batteries when the daylight photography is selected; and
   j. driving voltage supplying means having a pair of driving voltage supplying terminals, one of said pair of driving voltage supplying terminals being connected to the ground, and being connected to one of the pair of driving voltage receiving terminals, which terminal is connected to the driving voltage receiving positive terminal of the transistorized detecting circuit, while one of said pair of driving voltage supplying terminals is connected to the other of the pair of driving voltage receiving terminals and being connected to the outer negative terminal of the series-connected batteries.

2. A camera system according to claim 1, wherein said amplifier means consists of an operational amplifier.

3. A camera system according to claim 1, wherein said detecting circuit includes a transistor having a base electrode connected to said storage capacitor.

4. A camera system comprising:
   a. a storage capacitor;
   b. a flash tube coupled to said storage capacitor for illuminating an object with a light energy corresponding to electric energy stored in the storage capacitor;
   c. a transistorized detecting circuit connected to the storage capacitor for producing a control signal corresponding to the level of stored electric energy, said transistorized detecting circuit having a control signal terminal for transferring the control signal and a pair of driving voltage receiving terminals and a driving voltage receiving positive terminal of the transistorized detecting circuit being grounded through a switching means;
   d. light sensitive means for producing a first electrical signal corresponding to the amount of light incident from the object to be photographed and including a pair of output terminals;
   e. series-connected batteries, each having positive and negative electrodes, said connection of batteries having a connection point and having an outer positive terminal and an outer negative terminal;
   f. amplifier means having power source terminals coupled to the outer terminals of said series-connected batteries and having a pair of input terminals and an output terminal;
   g. an exposure meter coupled to the output terminal of said amplifier means for indicating an exposure value corresponding to the first electrical signal;
   h. bias voltage means having an output terminal;
   i. control signal adjusting means for regulating the level of the control signal from said detecting circuit so as to make consistent the output characteristics of said exposure meter in a flash photography mode with the output characteristics of said exposure meter in a daylight photography mode, said control signal adjusting means having an output terminal to transmit the regulated control signal and an input terminal connected to the control signal terminal of said detecting circuit;
   j. first change-over means connected with the pair of input terminals of said amplifier means for coupling the pair of output terminals of said light sensitive means with the pair of input terminals of said amplifier means upon the selection of the daylight photography mode and for coupling both output terminals of said bias voltage means and control signal adjusting means with the pair of input terminals of said amplifier means upon the selection of the flash photography mode;
   k. a second change-over means connected to ground, which second change-over means is connected to the connection point of the series-connected batteries when the flash photography mode is selected, and is coupled to the outer negative terminal of the series-connected batteries when the daylight photography mode is selected; and
   l. driving voltage supplying means having a pair of driving voltage supplying terminals, one of said pair of driving voltage supplying terminals being connected to ground, and being connected to one of the pair of driving voltage receiving terminals, which terminal is connected to the driving voltage receiving positive terminal of the transistorized detecting circuit, while one of said pair of driving voltage supplying terminals is connected to the other of the pair of driving voltage receiving terminals and is connected to the outer negative terminal of the series-connected batteries.

* * * * *